United States Patent
Tseng et al.

(10) Patent No.: US 10,103,895 B1
(45) Date of Patent: Oct. 16, 2018

(54) METHOD FOR PHYSICALLY UNCLONABLE FUNCTION-IDENTIFICATION GENERATION AND APPARATUS OF THE SAME

(71) Applicant: MACRONIX INTERNATIONAL CO., LTD., Hsinchu (TW)

(72) Inventors: Po-Hao Tseng, Taichung (TW); Yu-Yu Lin, New Taipei (TW); Kai-Chieh Hsu, Taoyuan (TW); Feng-Min Lee, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 0 days.

(21) Appl. No.: 15/782,890

(22) Filed: Oct. 13, 2017

(51) Int. Cl.
| | |
|---|---|
| G11C 11/00 | (2006.01) |
| H04L 9/32 | (2006.01) |
| G06F 21/73 | (2013.01) |
| H04L 9/08 | (2006.01) |
| G11C 13/00 | (2006.01) |

(52) U.S. Cl.
CPC ............ *H04L 9/3278* (2013.01); *G06F 21/73* (2013.01); *G11C 13/0059* (2013.01); *H04L 9/0866* (2013.01); *G06F 2212/1052* (2013.01); *H04L 2209/12* (2013.01)

(58) Field of Classification Search
CPC .................................................. G11C 13/0059
USPC ......................................................... 365/148
See application file for complete search history.

(56) References Cited

U.S. PATENT DOCUMENTS

| | | |
|---|---|---|
| 9,489,999 B2 | 11/2016 | Rosenberg et al. |
| 9,548,113 B2 | 1/2017 | Yoshimoto et al. |
| 2014/0268994 A1 | 9/2014 | Rose et al. |
| 2016/0301534 A1 | 10/2016 | Chen |
| 2017/0048072 A1 | 2/2017 | Cambou |
| 2017/0345490 A1* | 11/2017 | Yoshimoto .......... G11C 11/5642 |

* cited by examiner

*Primary Examiner* — Hoai V Ho
(74) *Attorney, Agent, or Firm* — McClure, Qualey & Rodack, LLP

(57) ABSTRACT

A method for physically unclonable function-identification (PUF-ID) generation includes: providing a PUF array having programmable resistance memory cells; performing a forming procedure followed by a programming procedure on all of the programmable resistance memory cells of the PUF array; performing an estimation process to estimate randomness of the PUF array, by comparing a reference current of a base unit to a total current passing through all of the programmable resistance memory cells for obtaining a PUF randomness; determining a setting result of randomness based on the estimation process; and generating a PUF-ID according to the setting result of randomness.

20 Claims, 9 Drawing Sheets

METHOD FOR PHYSICALLY UNCLONABLE FUNCTION-IDENTIFICATION GENERATION AND APPARATUS OF THE SAME

BACKGROUND

Field of the Invention

The disclosure relates in general to a method for physically unclonable function-identification (PUF-ID) generation and an apparatus of generating a PUF-ID, more particularly to a method for PUF-ID generation including estimation and determination of the PUF randomness.

Description of the Related Art

Physical unclonable function (PUF) is a solution to generate chip "fingerprints" as a hardware intrinsic security (HIS) technology. PUF application prevents physical attack attempting to extract digital information from a chip. SRAM (static random-access memory) is one of most popular device to implement PUF application, which uses the threshold voltage variation to generate chip ID during the power-up state. However, the SRAM PUF (ex: with six transistors) has large cell size, which is a concern for minimization of PUF array. Also, the SRAM PUF is susceptible to the environmental noise. For example, the SRAM PUF is quite sensitive to the noises generated by temperature and voltage level variations (such as the supply voltage $V_{DD}$). The hamming distances of the SRAM PUF is increased with the temperature, which indicated that the bit error rate (BER) is also increased. Accordingly, although the SRAM PUF can provide randomness and uniqueness for the PUF application, but the reliability is one of the major concerns due to the noise induced instability. Thus, the low bit error and high uniqueness of PUF-ID generation are required for high performance of PUF application.

Also, an ideal randomness of digital data "0" to digital data "1" (indicating low and high resistance states) of a PUF array is about 50% to 50%, which provides high uniqueness of PUF-ID. Conventionally, the resistances of the memory cells of a PUF array have to be examined and read bit by bit for determining the resistance states, which is time-consuming and would not be suitable for applying to a large PUF array (ex. 64 bits, 256 bits, 1 k bits, and so on.).

SUMMARY

The disclosure relates to a method for physically unclonable function-identification (PUF-ID) generation and an apparatus of generating the PUF-ID. A randomness of the resistance states of the programmable resistance memory cells of a PUF array can be identified quickly and simply by the embodied method.

According to one embodiment, a method for physically unclonable function-identification (PUF-ID) generation, comprising: providing a PUF array having programmable resistance memory cells; performing a forming procedure followed by a programming procedure on all of the programmable resistance memory cells of the PUF array; performing an estimation process to estimate randomness of the PUF array, by comparing a reference current ($I_{Ref}$) of a base unit (ex: MOSFET, without ReRAM) to a total current ($I_{Ttotal}$) passing through all of the programmable resistance memory cells for obtaining a PUF randomness; determining a setting result of randomness based on the estimation process; and generating a PUF-ID according to the setting result of randomness.

According to one embodiment, an apparatus with physically unclonable function-identification is provided, comprising: a programmable memory array (such as a PUF array) disposed in a PUF region of a substrate; a program controller disposed on the substrate and coupled to the programmable memory array; and a security logic unit disposed on the substrate and coupled to the program controller. The program controller executes steps of: performing a forming procedure and a programming (ex: SET) procedure on all of programmable resistance memory cells of the programmable memory array, wherein the programmable memory array is capable of creating one or more data sets after the programming procedure; performing an estimation process, to estimate randomness of the PUF array by comparing a reference current ($I_{Ref}$) of a base unit (ex: MOSFET, without ReRAM) to a total current ($I_{Ttotal}$) passing through all of the programmable resistance memory cells for obtaining a PUF randomness; determining a setting result of randomness based on the estimation process; and generating a PUF-ID according to the setting result of randomness, wherein the security logic unit stores the PUF-ID.

The disclosure will become apparent from the following detailed description of the preferred but non-limiting embodiments. The following description is made with reference to the accompanying drawings.

DETAILED DESCRIPTION

Figure 1:
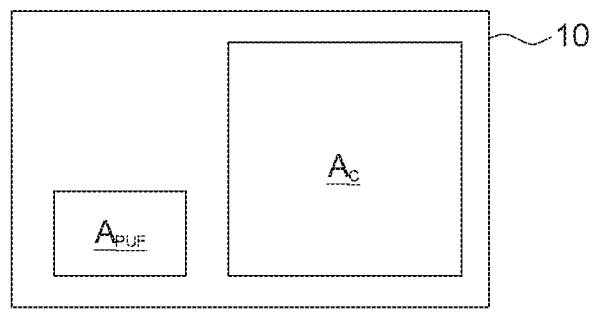
FIG. 1 is a simple drawing of an apparatus according to one embodiment of the present disclosure.

In the embodiments of the present disclosure, a method for physically unclonable function-identification (PUF-ID) generation and an apparatus of generating the PUF-ID are provided. According to the embodied method, a randomness of the resistance states of the programmable resistance memory cells of a PUF array can be identified quickly and simply, so as to determine if the steps of forming and programming (ex: SET procedure) the programmable resistance memory cells are required to execute again for reaching a randomness value approaching an ideal PUF randomness (ex: 50% of digital data "0" and 50% of digital data "1"). Thus, the time required for generating a PUF-ID with high uniqueness can be significantly shortened by using the embodied method for PUF-ID generation.

Embodiments are provided hereinafter with reference to the accompanying drawings for describing the related procedures and configurations. Related details such as PUF array and procedure examples are provided for exemplifying the practical applications by applying the embodied method for PUF-ID generation. However, the present disclosure is not limited thereto. It is noted that not all embodiments of the invention and the applications are shown. The identical and/or similar elements of the embodiments are designated with the same and/or similar reference numerals. Also, it is noted that there may be other embodiments of the present disclosure which are not specifically illustrated. Modifications and variations can be made without departing from the spirit of the disclosure to meet the requirements of the practical applications. It is also important to point out that the illustrations may not be necessarily be drawn to scale. Thus, the specification and the drawings are to be regard as an illustrative sense rather than a restrictive sense.

Moreover, use of ordinal terms such as "first", "second", etc., in the specification and claims to describe an element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

FIG. 1 is a simple drawing of an apparatus according to one embodiment of the present disclosure. According to the embodiment, an apparatus comprises a substrate 10 having a main function region $A_C$ and a sub-function region such as a PUF region $A_{PUF}$. In one embodiment, a programmable memory array such as a PUF array is disposed in the PUF region $A_{PUF}$, while a main function circuit (i.e. mission function circuits) is disposed in the main function region $A_C$. In one embodiment, the PUF array may comprise plural programmable resistance memory cells with PUF transistors (ex: PUF-MOSFET(1T)).

A typical programmable resistance memory cell may include a first electrode, a second electrode, and a programmable metal oxide memory element between the first and second electrodes. During a forming procedure, a forming pulse can have a voltage high enough to generate a conductive portion in the programmable metal oxide memory element of the memory cell. In some metal oxide memory materials, the conductive portion can comprise oxygen vacancies induced by electric fields across the material, and aligned to provide a conductive path. A forming pulse applied to the programmable resistance memory cells can result in formation of the conductive filaments connecting the first and second electrodes of a first subset of the programmable resistance memory cells, and fail to result in formation of a conductive filament connecting the first and second electrodes of a second subset of the programmable resistance memory cells. Consequently, the programmable resistance memory cells in the first subset can be in a low resistance state (LRS), while the programmable resistance memory cells in the second subset can be in a high resistance state (HRS). During a programming procedure (such as a "SET" procedure), a programming pulse is applied to the first subset and the second subset of the programmable resistance memory cells after the forming pulse, which stabilizes and enhances conductivity of the conductive filaments of the first subset of the programmable resistance memory cells (i.e. LRS memory cells), wherein the programmable resistance memory cells in the second subset are still in the HRS (i.e. no conductive filament grown) after the programming procedure. The low and high resistance states can be utilized to indicate the digital data "1" or "0" in the data set.

Figure 2:
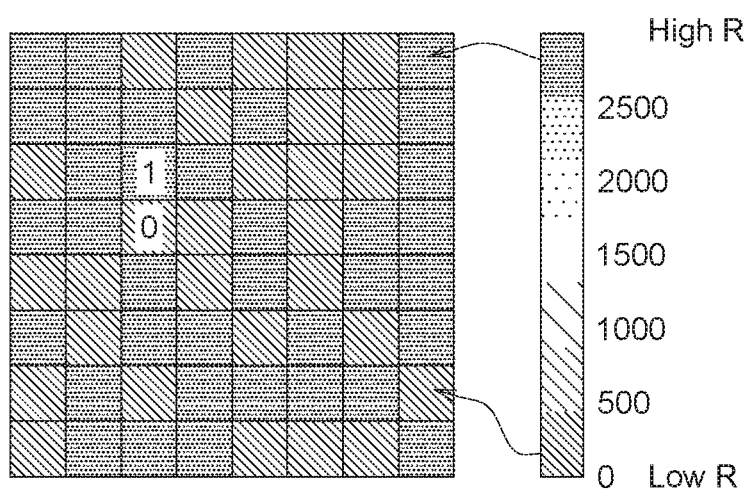
FIG. 2 depicts one bit-mapping condition of an applicable PUF array with 8×8 programmable resistance memory cells according to an embodiment.

FIG. 2 depicts one bit-mapping condition of an applicable PUF array with 8×8 programmable resistance memory cells according to an embodiment. According to one embodiment, the programmable resistance memory cells with turn-on transistors (i.e. memory cells in the LRS and large current passing through the memory cells) provide the digital data "0", and the programmable resistance memory cells with the turn-off transistors (i.e. memory cells in the HRS and low current passing through the memory cells) provide the digital data "1", and a combination of those induced random digital data in a array during the power-up state (as exemplified by one of combinations shown in FIG. 2) creates a particular chip "fingerprint" for a practical application.

After forming procedure and programming (ex: SET) procedure, the randomness of digital data "0" to digital data "1" of the programmable resistance memory cells of the PUF array has to be examined. An ideal randomness of digital data "0" to digital data "1" (indicating low and high resistance states of a PUF array) is about 50% to 50%, which provides high uniqueness of PUF-ID. If the examining randomness is not in an acceptable range, the forming procedure and the programming (ex: SET) procedure as described above would be performed repeatedly to all of the programmable resistance memory cells. The embodied method provides a simple and quick way to estimate a randomness of the PUF array.

Figure 3A:
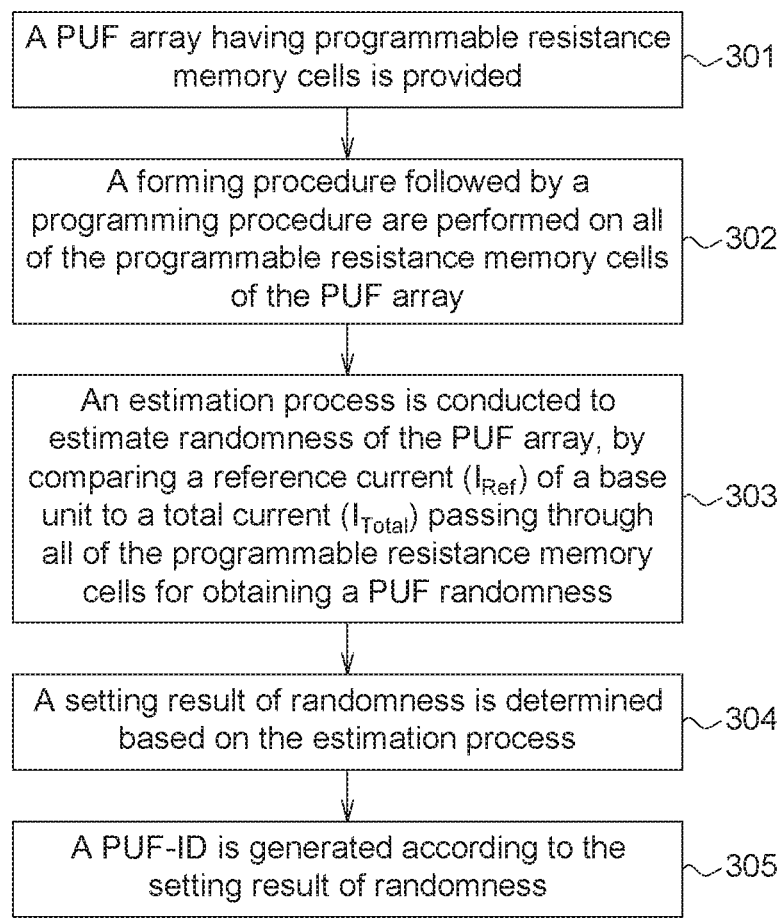
FIG. 3A is a flowchart of a method for physically unclonable function-identification (PUF-ID) generation according to one embodiment of the disclosure.

FIG. 3A is a flowchart of a method for physically unclonable function-identification (PUF-ID) generation according to one embodiment of the disclosure. In one embodiment, a PUF array having programmable resistance memory cells is provided (step 301). A forming procedure followed by a programming procedure (ex: SET procedure) are performed on all of the programmable resistance memory cells of the PUF array (step 302). Then, an estimation process is conducted to estimate randomness of the PUF array, by comparing a reference current ($I_{Ref}$) of a base unit (ex: MOSFET, without ReRAM) to a total current ($I_{Ttotal}$) passing through all of the programmable resistance memory cells for obtaining a PUF randomness (step 303). After the estimation process, a setting result of randomness is determined based on the estimation process (step 304). A PUF-ID is generated according to the setting result of randomness (step 305). In one example, a PUF-ID as generated is (not limited to) a data set composed of the digital values "0" and "1"; such as "00010101", "01001001101", . . . etc.

Figure 3B:
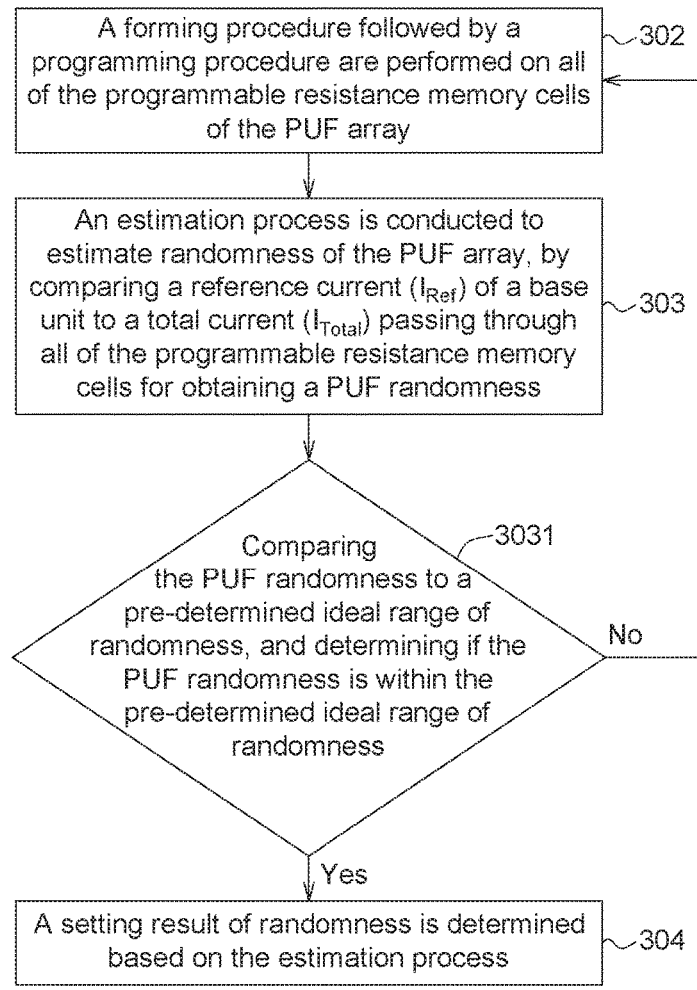
FIG. 3B is a flowchart showing an example for determining a setting result of randomness based on the estimation process of one embodiment.

Also, the forming procedure, the programming (ex: SET) procedure and the estimation process are performed repeatedly until the PUF randomness obtained in the estimation process is within a pre-determined ideal range of randomness. In one example, the pre-determined ideal range of randomness is a range approaching to an ideal PUF randomness, such as 50% of digital data "0" and 50% of digital data "1". FIG. 3B is a flowchart showing an example for determining a setting result of randomness based on the estimation process of one embodiment. As shown in step 3031, the PUF randomness is compared to a pre-determined ideal range of randomness. If the PUF randomness as estimated is within the pre-determined ideal range of randomness, a setting result of randomness can be determined (step 304). If the PUF randomness is out of the predetermined ideal range of randomness, all of the programmable resistance memory cells are subjected to the forming procedure and the programming procedure (performing step 302 again), followed by the estimation process (step 303), to obtain a re-created PUF randomness.

According to an estimation process of the embodiment, it is conducted to estimate randomness of a PUF array. A PUF randomness (as described in step 303) is obtained by comparing a reference current ($I_{Ref}$) of a base unit (such as a MOSFET without ReRAM) to a total current ($I_{Ttotal}$) passing through all of the programmable resistance memory cells. An example is provided for illustrating a reference current of a base unit, calculation of a total current of a PUF array, and determination of a PUF randomness of the PUF array. Noted that the programmable resistance memory cells of the example are arranged in a 3×3 array (i.e. the PUF array includes 9 programmable resistance memory cells).

Figure 4:
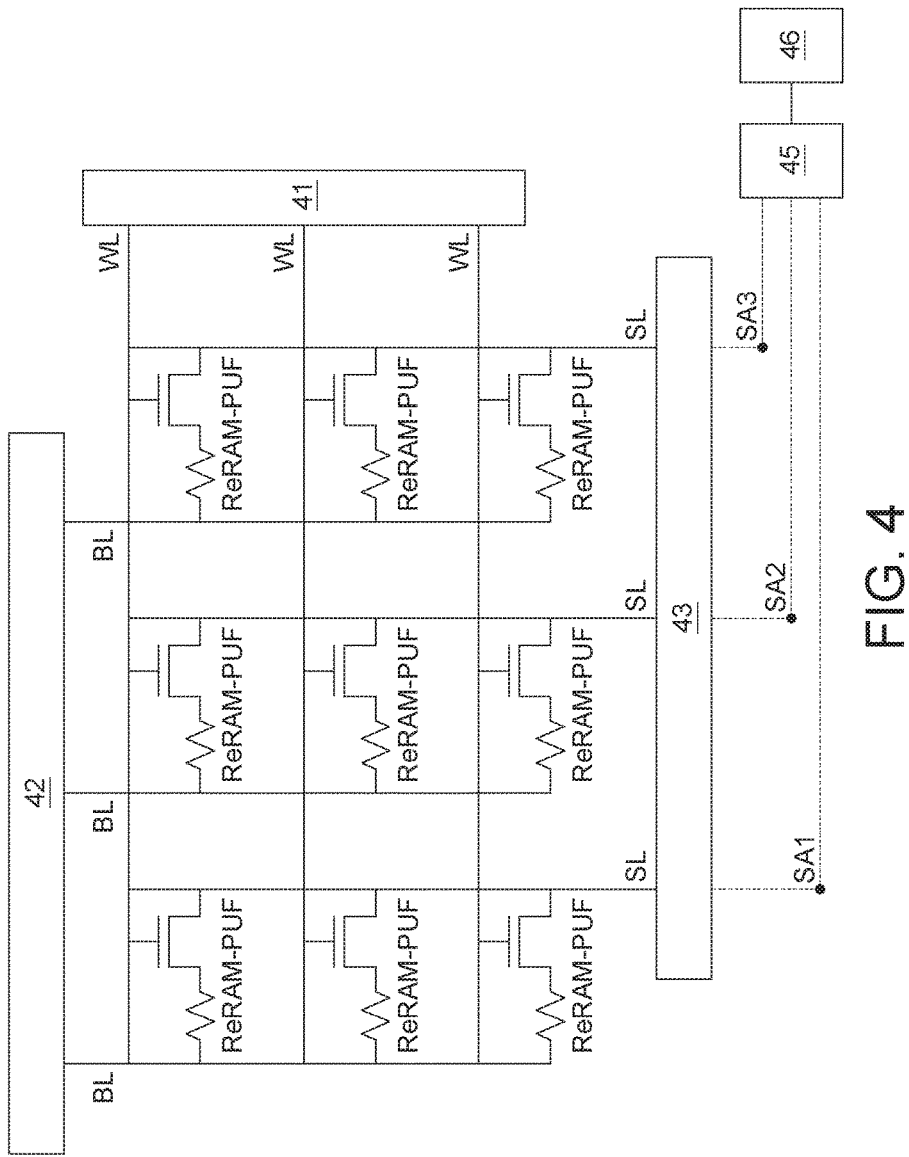
FIG. 4 shows a PUF array and related units electrically connected to the PUF array according to one embodiment of the disclosure.

FIG. 4 shows a PUF array and related units electrically connected to the PUF array according to one embodiment of the disclosure. The PUF array comprises 9 programmable resistance memory cells arranged in a 3×3 array, wherein a bit line (BL) connects the memory cells of the same column, a word line (WL) connects the memory cells of the same row, and a source line (SL) connects the memory cells of the same column. The related units electrically connected to the PUF array comprise a first controlling unit 41 electrically connected to the word lines (WL) of the memory cells, a second controlling unit 42 electrically connected to the bit lines (BL) of the memory cells, and a third controlling unit 43 electrically connected to the source lines (SL) of the memory cells. In one embodiment, the first controlling unit 41, the second controlling unit 42 and the third controlling unit 43 can be multiplexers for controlling the voltages applied to the word lines, the bit lines and the source lines. The related units electrically connected to the PUF array further comprise a first sensing amplifier SA1, a second sensing amplifier SA2 and a third sensing amplifier SA3 for sensing the currents passing through the memory cells of the first column, the second column and the third column, respectively. During the estimation process, all of the programmable resistance memory cells are selected by supplying predetermined voltages, followed by reading a total current, such as the reading the sum of the currents passing through the programmable resistance memory cells in each column as shown in FIG. 4. A processing unit 46 (disposed in a program controller 640 in FIG. 6 described later) can be adopted to calculate and obtain the total current, and a switch unit 45 is disposed between the processing unit 46 and the sensing amplifiers (i.e., SA1, SA2 and SA3) for protecting the processing unit 46 (as well as the program controller 640). For a programmable resistance memory cell in a high resistance state (HRS), an extremely low current passes the HRS cell and can be ignored in a total current as sensed. For a programmable resistance memory cell in a low resistance state (LRS), the current passes the LRS cell after supplying voltages, which is approximately equal to a current passing a base unit such as a MOSFET without ReRAM. Thus, the larger the total current as sensed, the larger percentage of the LRS cells existed in the PUF array.

Figure 5:
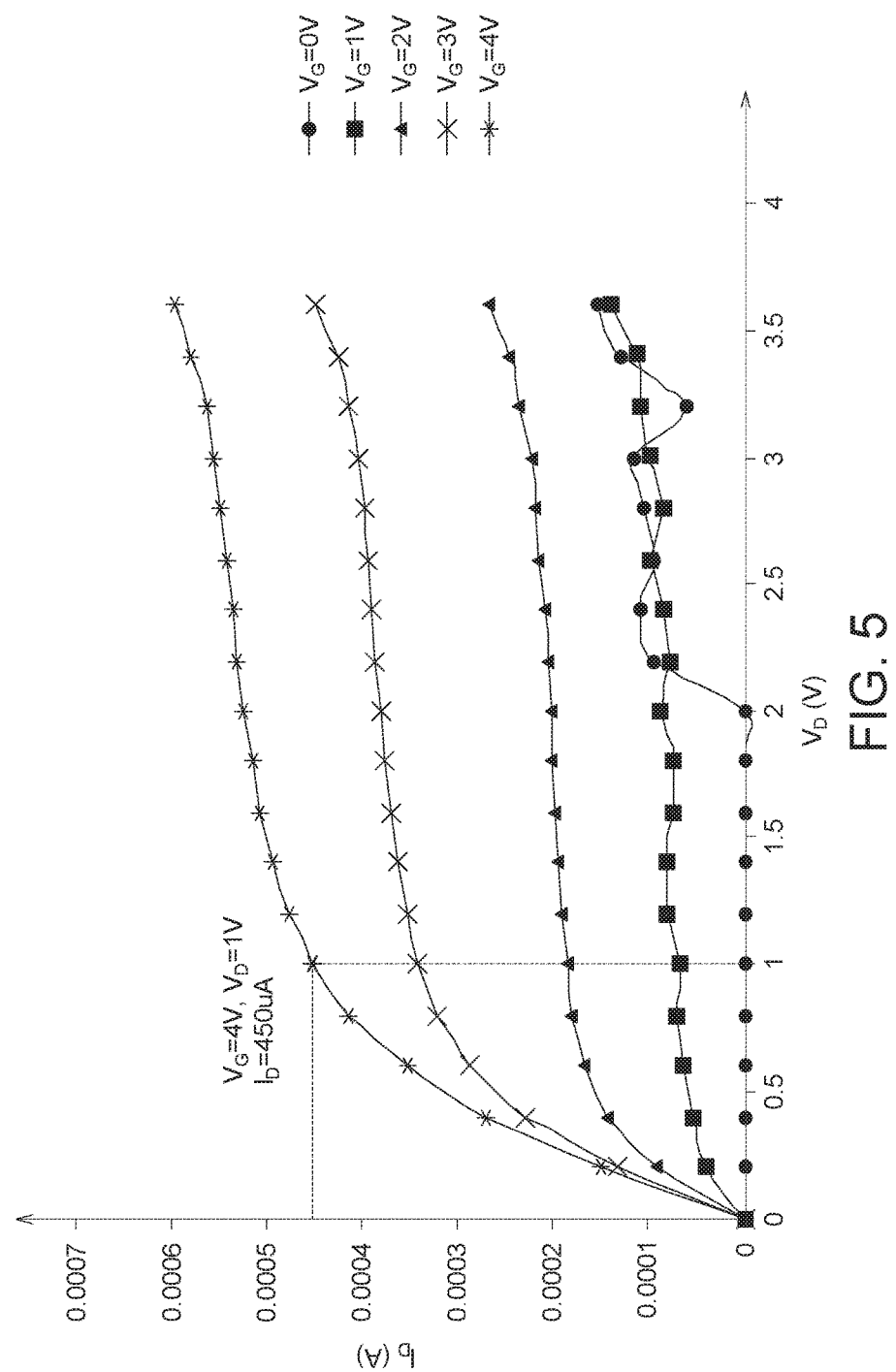
FIG. 5 shows an I-V curve of a MOSFET without ReRAM as a base unit according to an example of the embodiment.
Figure 6A:
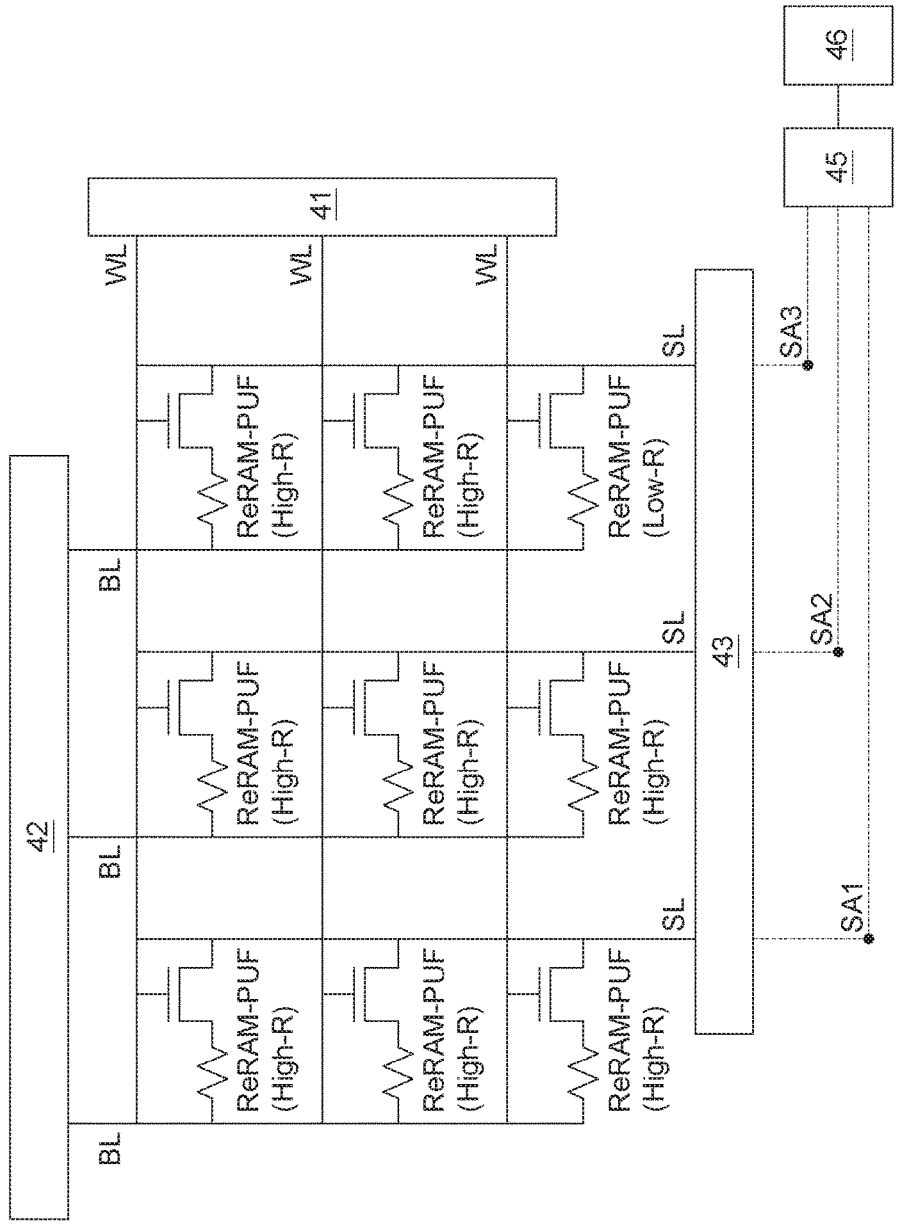
FIG. 6A-FIG. 6C depict three combinations of the LRS and HRS memory cells in the PUF arrays according to an example of the embodiment.
Figure 6B:
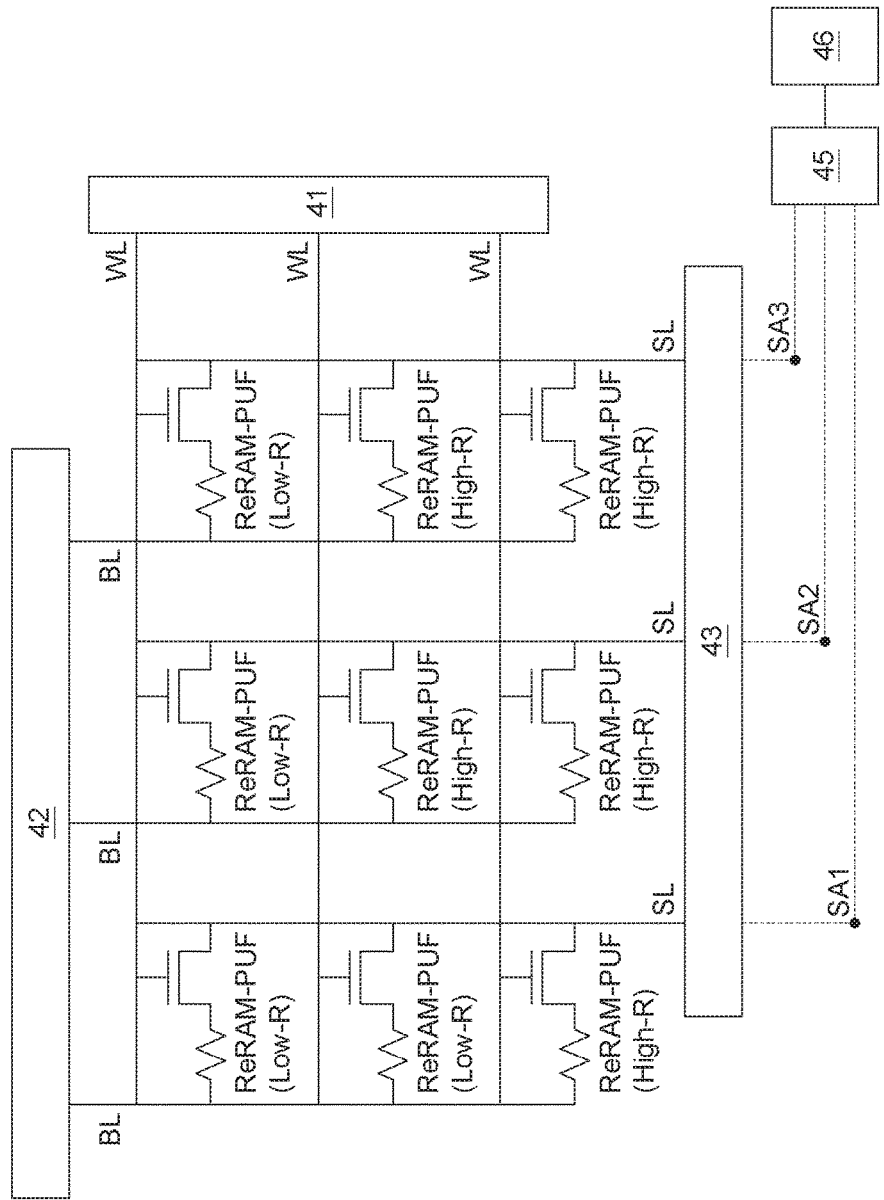
Figure 6C:
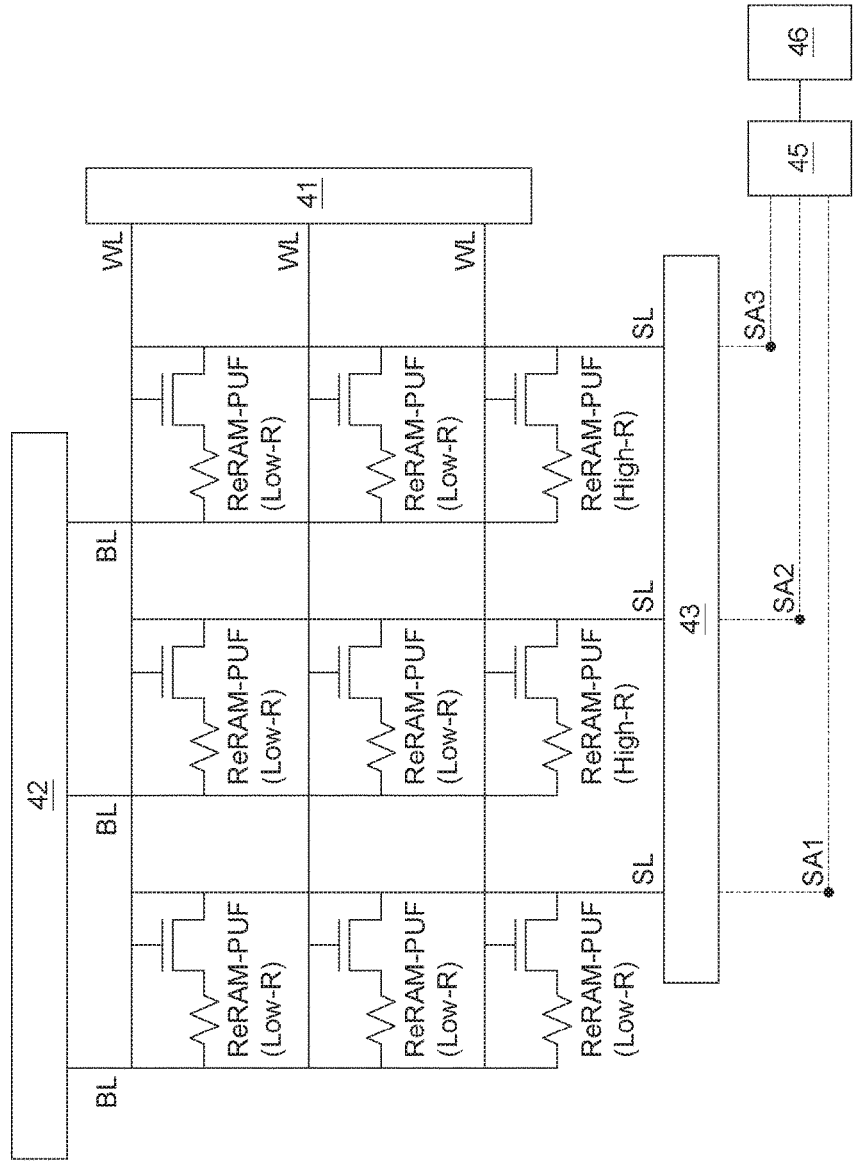

FIG. 5 shows an I-V curve of a MOSFET without ReRAM as a base unit according to an example of the embodiment. FIG. 6A-FIG. 6C depict three combinations of the LRS and HRS memory cells in the PUF arrays according to an example of the embodiment. Please refer to FIG. 5 and FIG. 6A-FIG. 6C.

In this example, a MOSFET (gate width=0.42 μm, gate length=0.18 μm) without ReRAM is regarded as a base unit during estimation. In FIG. 5, five different curves related to different voltages applied to word line (i.e. $V_g$=0V, 1V, 2V, 3V, 4V) are plotted, wherein $V_D$ is a read voltage applied to bit line. A reference current ($I_{Ref}$) can be determined according to an I-V curve of a base unit. As shown in FIG. 5, a reference current ($I_{Ref}$) can be determined as 450 μA (in the application of $V_g$=4V and $V_D$=1 V).

After performing the forming procedure and the programming (ex: SET) procedure, each of the programmable resistance memory cells in the PUF array (denoted as "ReRAM-PUF") may have a low resistance state (LRS) or a high resistance state (HRS). Before estimation process, the numbers of the HRS memory cells and the LRS memory cells in a PUF array of FIG. 6A(/FIG. 6B/FIG. 6C) are unknown. According to an estimation process of the embodiment, a total current ($I_{Ttotal}$) of FIG. 6A is about 450 μA, which is obtained by applying 4V for word lines (WL) and 1V for bit lines (BL) (0V for source lines) to all of the programmable resistance memory cells of the PUF array. According to an embodied estimation method, a number of the programmable resistance memory cells in a low resistance state (LRS) is determined according to a ratio (a number to the nearest integer) of the total current ($I_{Ttotal}$) to the reference current ($I_{Ref}$), i.e. $I_{Ttotal}/I_{Ref}$. Therefore, the ratio of the total current ($I_{Ttotal}$) 450 μA to the reference current ($I_{Ref}$) 450 μA is 1. That is, the PUF array in FIG. 6A has one LRS programmable resistance memory cell, and the percentage of LRS cell is about 11%. Thus, the PUF randomness of the PUF array in FIG. 6A is 11% (LR) vs. 89% (HR), which is far away from an ideal randomness (i.e. 50% vs. 50%). That is, the programmable resistance memory cells of the PUF array would be subjected to the forming procedure and the programming (ex: SET) procedure again (by modifying the operation conditions of the forming and SET procedures) to create another combination of LRS cell(s) and HRS cell(s) (i.e. re-construct the conductive filaments in the memory cells), and then, the estimation process is conducted to check the renewed PUF randomness of the PUF array (i.e. performing steps 3031, 302 and 303 in FIG. 3B). After re-examining the PUF array of FIG. 6A cell by cell, the result shows that the PUF array of FIG. 6A has 8 HRS memory cells and 1 LRS memory cell, which is identical to the result obtained from the embodied estimation method. Thus, the PUF randomness of the PUF array can be quickly obtained by using an estimation process of the embodiment, which is a time-saving way of randomness estimation.

Similarly, according to an estimation process of the embodiment, a total current ($I_{Ttotal}$) of FIG. 6B is about 1800(=450*4) μA, which is obtained by applying 4V for word lines (WL) and 1V for bit lines (BL) (0V for source lines) to all of the programmable resistance memory cells of the PUF array of FIG. 6B. A ratio of the total current ($I_{Ttotal}$) 1800 μA to the reference current ($I_{Ref}$) 450 μA (FIG. 5) is 4. That is, the PUF array in FIG. 6B has 4 LRS programmable resistance memory cell, and the percentage of LRS cell is about 44%. Thus, the PUF randomness of the PUF array in FIG. 6B is 44% (LR) vs. 56% (HR).

Similarly, according to an estimation process of the embodiment, a total current ($I_{Ttotal}$) of FIG. 6C is about 3150(=450*7) μA, which is obtained by applying 4V for word lines (WL) and 1V for bit lines (BL) (0V for source lines) to all of the programmable resistance memory cells of the PUF array of FIG. 6C. A ratio of the total current ($I_{Ttotal}$) 3150 μA to the reference current ($I_{Ref}$) 450 μA (FIG. 5) is 7. That is, the PUF array in FIG. 6 C has 7 LRS programmable resistance memory cell, and the percentage of LRS cell is about 78%. Thus, the PUF randomness of the PUF array in FIG. 6C is 78% (LR) vs. 22% (HR), which would be outside the pre-determined ideal range of randomness.

In one example, if it is an acceptable range of PUF randomness that a number of the programmable resistance memory cells in a low resistance state (LRS) is 40%-60% of a total number of the programmable resistance memory cells of the PUF array, "40%-60% (LR) vs. 60%-40% (HR)" can be selected as a pre-determined ideal range of randomness. If the PUF randomness (such as 44% (LR) vs. 56% (HR) in FIG. 6B) is determined as within the pre-determined ideal range of randomness, the setting result of randomness can be determined (step 304 in FIG. 3B), and a PUF-ID can be generated according to the setting result of randomness (step 305 in FIG. 3A; and the generated PUF-ID is stored in the security logic unit 625 described later).

Accordingly, the voltages applied to the conductive lines (ex: word lines and the bit lines) of a base unit and a PUF array would be the same to obtain a reference current of the base unit and a total current of the PUF array for comparison. Thus, in one example, a reference current ($I_{Ref}$) of the embodiment is obtained by applying a first voltage and a second voltage respectively to a gate and a drain of a transistor of the base unit, while a total current ($I_{Ttotal}$) is obtained by applying the first voltage and the second voltage respectively through word lines (WL) and bit lines (BL) to all of the programmable resistance memory cells of the PUF array. Additionally, if a PUF array comprises Q of the programmable resistance memory cells in total and a number of the programmable resistance memory cells in a low resistance state (LRS) is X (determined according to a ratio of $I_{Ttotal}/I_{Ref}$ as described above), the PUF randomness can be obtained and expressed as (X/Q)×100% vs. ((Q−X)/Q)× 100%, wherein X and Q are positive integers. By comparing the PUF randomness to a pre-determined ideal range of randomness, choosing a setting result of randomness based on the estimation process (ex: step 304) or repeatedly performing the forming procedure, the programming (ex: SET) procedure and the estimation process (ex: steps 3031, 302 and 303 in FIG. 3B) can be determined.

Although the exemplified PUF array as shown in FIG. 4 (or FIG. 6A-FIG. 6C) is a 3×3 array, the practical application is not limited to those number and arrangement. A PUF array in the applications may include a matrix of m×n (m columns and n rows; a total number of memory cells is m×n) programmable resistance memory cells, or other types of cell arrangements. The method of the embodiment is applicable to different types of cell arrangements, and not limited to the arrays in matrixes. Also, the reference current ($I_{Ref}$) of 450 µÅ, the current of a base unit at read voltage 1V, are exemplified values provided merely for illustrating the estimation process of the embodiment, not the values provided for limitation. The read voltage (VD) can be decreased to reduce the total current ($I_{Ttotal}$). For example, the reference current ($I_{Ref}$) of a base unit can be decreased, such as decreased to 1 uA when the read voltage is down to 0.01 V. For one application having a 1K bit PUF array with best randomness (50% for LRS, 50% for HRS), the total current would be 500uA for read voltage at 0.01 V. It is beneficial to get a suitable total current level using an optimized read voltage for the real circuit application and also avoid metal line migration problem.

Figure 7:
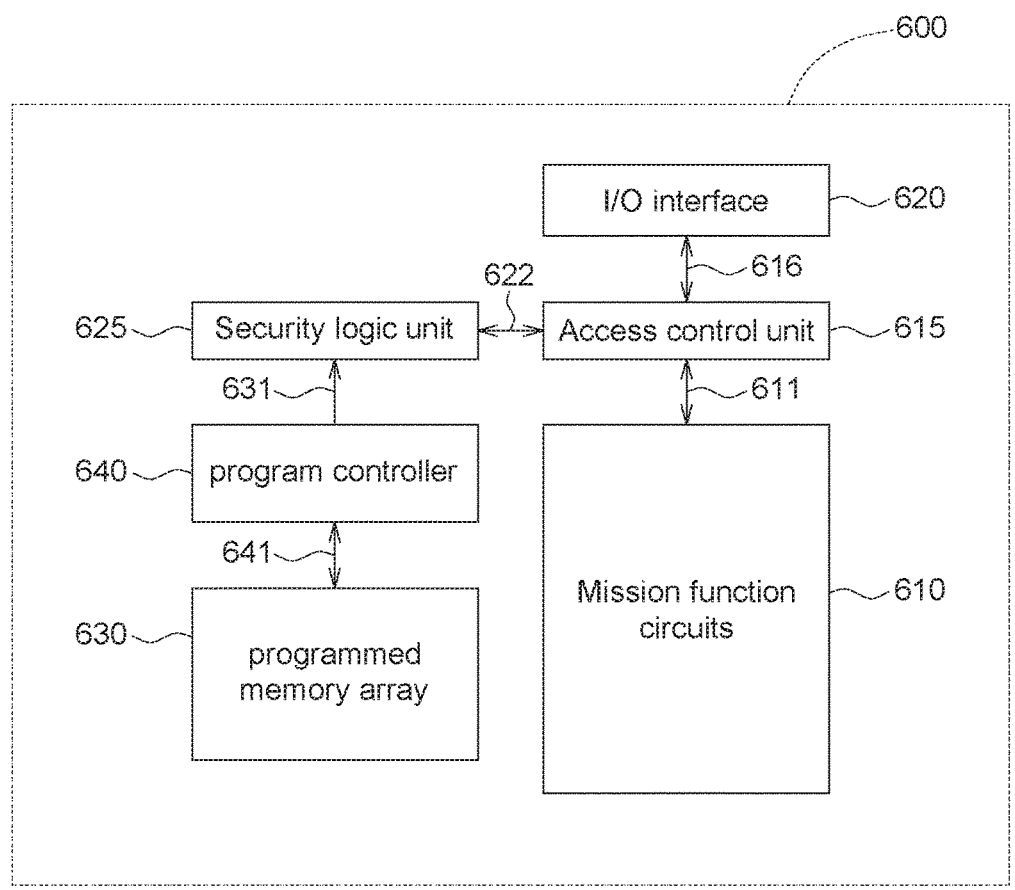
FIG. 7 shows a simplified block diagram of an apparatus with physically unclonable function-identification according to one embodiment in an application.

FIG. 7 shows a simplified block diagram of an apparatus with physically unclonable function-identification according to one embodiment in an application.

In this application, an apparatus comprises an integrated circuit 600 having a programmable memory array 630 (such as a PUF array comprising a plurality of programmable resistance memory cells, disposed in a PUF region of a substrate) and a controller (such as a program controller 640) to create one or more data sets in the programmable memory array 630. One of the data sets (ex: the randomness of the digital data 0 and 1 is close to 50% and 50%) could be determined as an optimal data sets (i.e. the PUF-ID), which is a "fingerprint" of a chip. According to the embodiment, the program controller 640 (disposed on the substrate and coupled to the programmable memory array 630 through the bus 641) executing steps comprising: performing a forming procedure and a programming (ex: SET) procedure on all of programmable resistance memory cells of the programmable memory array (ex: step 302 of FIG. 3A), wherein the programmable memory array is capable of creating one or more data sets after the programming procedure; performing an estimation process, to estimate randomness of the PUF array by comparing a reference current ($I_{Ref}$) of a base unit (ex: MOSFET, without ReRAM) to a total current ($I_{Ttotal}$) passing through all of the programmable resistance memory cells for obtaining a PUF randomness (ex: step 303 of FIG. 3A and FIG. 3B); determining a setting result of randomness based on the estimation process (ex: step 304 of FIG. 3A and FIG. 3B); and generating a PUF-ID according to the setting result of randomness (ex: step 305 of FIG. 3A).

Accordingly, in this example of the apparatus, the program controller 640 provides signals to control the application of bias arrangement supply voltages to carry out the forming procedure, the programming procedure (ex: step 302 in FIG. 3A) and other operations involved in accessing the programmed memory array 630, and the program controller 640 also reads the one or more data sets after execution of the programming procedure in the programmable memory array and performs the estimation process.

The integrated circuit 600 also includes mission function circuits 610, which can comprise special purpose logic sometimes referred to as application-specific integrated circuit logic, data processor resources such as used in microprocessors and digital signal processors, large-scale memory such as flash memory, DRAM memory, programmable resistance memory and combinations of various types of circuits known as system on a chip configurations. The integrated circuit 600 also includes an input/output (I/O) interface 620, which can comprise wireless or wired ports providing access to other devices or networks. In this simplified illustration, an access control unit 615 is disposed between the input/output (I/O) interface 620 and the mission function circuits 610. The access control unit 615 is coupled to the input/output interface 620 by the bus 616, and coupled to the mission function circuits 610 by the bus 611. An access control protocol is executed by the access control unit 615 to enable or disable communications between the mission function circuits 610 and the input/output (I/O) interface 620.

In support of the access control unit 615, a security logic unit 625 is disposed on the chip in this example. The security logic unit 625 is coupled to a programmed memory array 630, and the security logic unit 625 is able to store one unique data set from the one or more data sets as the PUF-ID. The unique data set (i.e. the PUF-ID) is accessible on a bus 631 by the security logic unit 625 through the program controller 640 (such as a PUF program controller), and the unique data set stored in the security logic unit 625 is utilized in communications across the bus 622 with the access control unit 615.

According to the aforementioned descriptions, a method for physically unclonable function-identification (PUF-ID)

generation and an apparatus of generating the PUF-ID are provided. A randomness of the resistance states of the programmable resistance memory cells of a PUF array can be quickly identified in a simple way by the embodied method. Whether the memory cells of the PUF array have to be subjected to the forming and programming (ex: SET) procedures again for obtaining a renew combination of LRS and HRS can be efficiently determined. Therefore, the time required for generating a PUF-ID with high uniqueness (i.e. a randomness value approaching an ideal PUF randomness such as 50% of digital data "0" vs 50% of digital data "1") can be significantly shortened by using the embodied method for PUF-ID generation. Also, a randomness estimation of a PUF array can be identified accurately by applying the embodied method, which correctly acquires the information of the resistance states of the PUF array. Thus, the method for PUF-ID generation according to the embodiment not only saves the time of PUF randomness estimation, but also provides an essentially high uniqueness PUF-ID.

Other embodiments with different configurations of known elements in the device/apparatus can be applicable, and the arrangement depends on the actual needs of the practical applications. It is, of course, noted that the configurations of figures are depicted only for demonstration, not for limitation. It is known by people skilled in the art that the positional relationship of the constituting elements and the procedure details could be adjusted according to the requirements and/or manufacturing steps of the practical applications.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for physically unclonable function-identification (PUF-ID) generation, comprising:
   providing a PUF array having programmable resistance memory cells;
   performing a forming procedure followed by a programming (ex: SET) procedure on all of the programmable resistance memory cells of the PUF array;
   performing an estimation process to estimate randomness of the PUF array, by comparing a reference current ($I_{Ref}$) of a base unit (ex: MOSFET, without ReRAM) to a total current ($I_{Ttotal}$) passing through all of the programmable resistance memory cells for obtaining a PUF randomness;
   determining a setting result of randomness based on the estimation process; and
   generating a PUF-ID according to the setting result of randomness.

2. The method for PUF-ID generation according to claim 1, wherein a number of the programmable resistance memory cells in a low resistance state (LRS) is determined according to a ratio (in an integer) of the total current ($I_{Ttotal}$) to the reference current ($I_{Ref}$).

3. The method for PUF-ID generation according to claim 2, wherein the PUF array comprises Q of the programmable resistance memory cells in total and the number of the programmable resistance memory cells in the low resistance state (LRS) is determined as X, the PUF randomness is calculated as (X/Q)×100% vs. ((Q−X)/Q)×100%, wherein X and Q are positive integers.

4. The method for PUF-ID generation according to claim 3, wherein the setting result of randomness is determined when the PUF randomness is estimated in a range of 40%-60% vs. 60%-40%.

5. The method for PUF-ID generation according to claim 1, wherein the reference current ($I_{Ref}$) is obtained by applying a first voltage and a second voltage respectively to a gate and a drain of a transistor as the base unit.

6. The method for PUF-ID generation according to claim 5, wherein the total current ($I_{Ttotal}$) is obtained by applying the first voltage and the second voltage respectively through word lines (WL) and bit lines (BL) to all of the programmable resistance memory cells.

7. The method for PUF-ID generation according to claim 1, further comprising:
   comparing the PUF randomness to a pre-determined ideal range of randomness.

8. The method for PUF-ID generation according to claim 7, wherein if the PUF randomness is within the pre-determined ideal range of randomness, the setting result of randomness is determined.

9. The method for PUF-ID generation according to claim 8, wherein if the PUF randomness is out of the pre-determined ideal range of randomness, all of the programmable resistance memory cells are subjected to the forming procedure and the programming procedure again.

10. The method for PUF-ID generation according to claim 1, wherein the forming procedure, the programming procedure and the estimation process are performed repeatedly until the PUF randomness obtained in the estimation process is within a pre-determined ideal range of randomness.

11. The method for PUF-ID generation according to claim 1, wherein the setting result of randomness is determined when a number of the programmable resistance memory cells in a low resistance state (LRS) is 40%-60% of a total number of the programmable resistance memory cells of the PUF array.

12. An apparatus with physically unclonable function-identification, comprising:
   a programmable memory array (ex: PUF array), disposed in a PUF region of a substrate;
   a program controller, disposed on the substrate and coupled to the programmable memory array, and the program controller executing steps comprising:
      performing a forming procedure and a programming (ex: SET) procedure on all of programmable resistance memory cells of the programmable memory array, wherein the programmable memory array is capable of creating one or more data sets after the programming procedure;
      performing an estimation process, to estimate randomness of the PUF array by comparing a reference current ($I_{Ref}$) of a base unit (ex: MOSFET, without ReRAM) to a total current ($I_{Ttotal}$) passing through all of the programmable resistance memory cells for obtaining a PUF randomness;
      determining a setting result of randomness based on the estimation process; and
      generating a PUF-ID according to the setting result of randomness;
   a security logic unit, disposed on the substrate and coupled to the program controller, wherein the security logic unit stores the PUF-ID.

13. The apparatus according to claim 12, further comprising:
   a mission function circuit, disposed in a main function region of the substrate;

an access control unit, coupled to the mission function circuit and the security logic unit;

wherein the PUF-ID stored in the security logic unit is utilized in communications with the access control unit.

14. The apparatus according to claim 13, further comprising an input/output (I/O) interface coupled to the access control unit, wherein the access control unit is disposed between the I/O interface and the mission function circuit, and an access control protocol is executed by the access control unit to enable or disable communications between the mission function circuit and the I/O interface.

15. The apparatus according to claim 12, wherein the program controller provides signals to control application of bias arrangement supply voltages to carry out the forming procedure and the programming procedure, and the program controller also reads the one or more data sets after execution of the programming procedure in the programmable memory array and performs the estimation process, wherein the security logic unit stores one unique data set from the one or more data sets as the PUF-ID.

16. The apparatus according to claim 12, wherein a number of the programmable resistance memory cells in a low resistance state (LRS) is determined according to a ratio (in an integer) of the total current ($I_{Ttotal}$) to the reference current ($I_{Ref}$).

17. The apparatus according to claim 16, wherein the programmable memory array comprises Q of the programmable resistance memory cells in total and the number of the programmable resistance memory cells in the low resistance state (LRS) is determined as X, the PUF randomness is calculated as $(X/Q)\times 100\%$ vs. $((Q-X)/Q)\times 100\%$, wherein X and Q are positive integers.

18. The apparatus according to claim 12, wherein the reference current ($I_{Ref}$) is obtained by applying a first voltage and a second voltage respectively to a gate and a drain of a transistor as the base unit, and the total current ($I_{Ttotal}$) is obtained by applying the first voltage and the second voltage respectively through word lines (WL) and bit lines (BL) to all of the programmable resistance memory cells.

19. The apparatus according to claim 12, wherein the program controller further executes a step of:

comparing the PUF randomness to a pre-determined ideal range of randomness, wherein, when the PUF randomness is within the pre-determined ideal range of randomness, the setting result of randomness is determined; and when the PUF randomness is out of the pre-determined ideal range of randomness, the forming procedure, the programming procedure and the estimation process are repeatedly performed.

20. The apparatus according to claim 12, wherein the setting result of randomness is determined when a number of the programmable resistance memory cells in a low resistance state (LRS) is 40%-60% of a total number of the programmable resistance memory cells of the programmable memory array.

* * * * *